(12) United States Patent
Stewart

(10) Patent No.: US 8,607,930 B2
(45) Date of Patent: Dec. 17, 2013

(54) EXTENDABLE LADDER FOR BOAT TRAILER OR OTHER TRAILER TO ACCESS AN ELEVATED SURFACE

(76) Inventor: Robert Gail Stewart, Andrews, TX (US)

(*) Notice: Subject to any disclaimer, the term of this patent is extended or adjusted under 35 U.S.C. 154(b) by 0 days.

(21) Appl. No.: 12/939,164

(22) Filed: Nov. 3, 2010

(65) Prior Publication Data

US 2012/0090919 A1 Apr. 19, 2012

Related U.S. Application Data

(60) Provisional application No. 61/257,831, filed on Nov. 3, 2009.

(51) Int. Cl.
*E06C 9/06* (2006.01)

(52) U.S. Cl.
CPC ....................................... *E06C 9/06* (2013.01)
USPC ................... 182/93; 182/95; 182/96; 182/97; 114/362

(58) Field of Classification Search
USPC ........... 182/82, 83, 84, 85, 86, 93, 94, 95, 96, 182/97; 114/362
See application file for complete search history.

(56) References Cited

U.S. PATENT DOCUMENTS

| 2,863,594 | A | * | 12/1958 | Shafer | 182/36 |
| 3,025,923 | A | * | 3/1962 | Burnstein | 182/96 |
| 3,030,166 | A | * | 4/1962 | Baker et al. | 312/235.1 |
| 3,136,386 | A | * | 6/1964 | Jung et al. | 182/77 |
| 3,498,410 | A | * | 3/1970 | Storch | 182/96 |
| 3,946,833 | A | * | 3/1976 | Riehlmann | 182/20 |
| 4,029,223 | A | * | 6/1977 | Adamski et al. | 414/546 |
| 6,789,648 | B2 | * | 9/2004 | Cook | 182/86 |
| 7,025,174 | B1 | * | 4/2006 | Hawley | 182/88 |
| 7,644,677 | B2 | * | 1/2010 | Nakano | 114/362 |

* cited by examiner

*Primary Examiner* — Alvin Chin Shue
*Assistant Examiner* — Colleen M Chavchavadeze
(74) *Attorney, Agent, or Firm* — McNeely, Hare & War LLP; William D. Hare

(57) ABSTRACT

The invention relates to an extendable/retractable ladder mounted to a boat trailer to allow access to a boat carried on the trailer. The ladder includes a pair of first vertically oriented bars and a pair of second bars. The vertically oriented bars have an inner cavity and a slot in one of its sides. The second bars have an inner cavity and a slot in one of its sides. The first end of the first bars and the second end of the second bars are connected such that the second end of the second bars can move along the length of the first bars between an extended position in which the first end of the second bars is a distance away from the first bars and a retracted position in which the first end and the second end of the second bars are adjacent to the first bars.

6 Claims, 15 Drawing Sheets

EXTENDABLE LADDER FOR BOAT TRAILER OR OTHER TRAILER TO ACCESS AN ELEVATED SURFACE

CROSS-REFERENCE TO RELATED APPLICATIONS

This application claims priority from provisional patent application No. 61/257,831 filed on Nov. 3, 2009, and entitled Extendable Ladder for Boat Trailer or Other Trailer to Access an Elevated Surface, the entirety of which is incorporated herein by reference.

TECHNICAL FIELD

The field of the invention generally relates to extendable/retractable ladders mounted to boat trailers and the like for providing improved safety and ease when accessing the boat carried on the trailer.

BACKGROUND

The inventor has observed that there is a need for improving the safety and ease by which individuals access the bow of a boat mounted on a trailer, for example, to get on the boat before the trailer and boat backed into the water to launch the boat. Current trailers typically have a ladder mounted near the bow stop of the trailer so that a person can climb the ladder and access the bow of the boat. The current ladders, however, are not completely satisfactory because they either have too much of a vertical orientation, are flimsy or narrow, do not reach the top surface of the bow, do not come close enough to the ground to allow easy stepping onto the ladder, or do not includes handles for climbing up the ladder. The prior art discloses numerous other methods of mounting ladders to objects such as vehicles.

It also is known to use ladders on trailers. For example, U.S. Pat. No. 7,100,740 discloses a boat trailer in which a boat trailer ladder is secured to and movable along the trailer rails. A hook engages the ladder to standard boat trailer rails. An A-frame ladder provides steps from approximately the level of the trailer rails, or in alternative embodiments from approximately ground level, up for a distance above the trailer rails.

U.S. Pat. No. 6,932,193 discloses a boat ladder attached to a trailer for access to a bow of a boat. The ladder has two side rails with spaced-apart steps or rungs between the side rails, the lower portion of one of the side rails curving a predetermined distance toward the other side rail and then running parallel with the other side rail wherein the lower ends of the ladder side rails fit into bases secured to a front longitudinal member of the trailer. The bases are secured on each side of the longitudinal member, i.e., the tongue, of the trailer, and the lower ends of the side rails fit into cylindrical tubes attached to the sides of the base.

U.S. Pat. No. 6,782,640 discloses a boat ladder having a rigid I-beam support with steps pivotally attached for making the ladder compact. The ladder is pivotally engaged with a compartment in the boat hull for storing the ladder when not in use.

U.S. Pat. No. 6,755,146 discloses a ladder which is described as being useful as a boat ladder. The ladder is constructed with a pair of centrally located side-by-side elongated support members which are movable lengthwise, to a limited degree, with respect to one another. The ladder rungs are pivotally attached to the support members such that that when one support member is moved lengthwise the rungs are swung to extend outward from the support members for use as a stepping ladder and swung inward to be in line with the support members to make the ladder compact for storage. The ladder is pivotably engageable with a storage compartment in a boat hull for swinging the ladder downward for use from an opening in the compartment and upward in line with the opening for insertion into the compartment for storage.

U.S. Pat. No. 5,896,946 discloses an access step and winch mounting assembly for a load carrying device, such as a boat trailer. The assembly includes a front member for mounting on a frame of the trailer, a top member extending from the front member and a cross bar connected to the top member. The top member mounts a winch for drawing a load, such as a boat, onto the trailer. The cross bar mounts load-engaging members. A step subassembly includes a stringer depending downwardly from the cross bar and multiple rungs with arcuate configurations each extending between the front member and the stringer member. The step subassembly is outwardly and laterally convex.

U.S. Pat. No. 4,943,076 discloses a trailer step with footing for a person launching or loading a boat onto a trailer. The trailer step includes a step formed with a platform and two parallel side plates. The side plates snugly receive the trailer tongue therebetween and extend below the tongue. Tightening bolts through the side plates sandwiches the tongue therebetween to rigidly mount the safety trailer step to the trailer tongue. The platform may be centered over the tongue, or it may be laterally offset therefrom. A non-skid plastic plate may be attached to the platform's upper surface.

SUMMARY

In one general aspect, a ladder is configured to be mounted to a boat trailer to allow access to a boat carried on the trailer. The ladder includes a pair of first vertically oriented bars, a pair of second bars and a pair of third bars. The pair of first, vertically oriented bars have a length defined between a first end and a second end, an inner cavity passing between the first end and the second end, at least two sides, and a slot in one of the sides extending from the first end in the direction of the second end. The pair of second bars have a first end and a second end, an inner cavity passing between the first end and the second end, at least two side, and a slot in one of the sides extending from the first end in the direction of the second end, the first end of the first bars and the second end of the second bars being connected such that the second end of the second bars can move along the length of the first bars between an extended position in which the first end of the second bars is a distance away from the first bars and a retracted position in which the first end and the second end of the second bars are adjacent to the first bars. The pair of third bars are pivotally connected at a first end to the second end of the first bars and pivotally connected at a second end to the first end of the second bars such that the second end of the third bars are at a distance away from the first bars in an extended position and are adjacent to the first bars in a retracted position.

Embodiments of the ladder may include one or more of the following features. For example, each of the first bars and each of the second bars may be connected using a wheel having an axle wherein each wheel is positioned within the cavity of the first bar, the axle passes through the slot in the side of the first bar and is mounted at the second end of the second bar, whereby the wheels roll within the cavity of the first bar.

Each of the third bars may be received into the slot in the second bars when the ladder is in a retracted position. The third bars may slide into the inner cavity of the second bars such that a portion of the third bars are surround by a portion of the second bars in which the slot is not present such that the second bars and third bars do not pivot relative to each other. The third bars may include a slot within the bar, the slot positioned adjacent to the second end of the bars and passing between a first closed end and a second closed end, whereby in the retracted position, a portion of the slot is positioned within the cavity of the second bars.

The first bars and second bars may be made of aluminum. The third bars may be made of aluminum. The second bars may be joined by one or more ladder rungs.

In another general aspect, there is provided a bow stop for a boat trailer that includes a ladder having the features described above. The bow stop may be mounted to a boat trailer.

In another general aspect there is provided a boat trailer having the ladder described above with one or more of the features described above.

In another general aspect there is provided a trailer having the ladder described above with one or more of the features described above.

In another implementation, there is provided a ladder for mounting to a trailer to allow access to the trailer. The ladder includes a pair of side rails, one or more ladder rungs, and a pair of bars, and a pair of bearings. Each side rail has a length defined between an upper, first end and a lower, second end. The side rail has an inner channel passing between the first end and the second end and defined by at least four sides having inner and outer surfaces. The side rail includes a first slot in one of the sides passing from the inner surface to the outer surface and extending from the first end to a middle portion of the side and a second slot in one of the side passing from the inner surface to the outer surface and extending from the second end to the middle portion of the side. The first slot does not extend to the second slot.

The one or more ladder rungs extend between the side rails.

Each side rail further includes a first pin or bolt extending from at least one side of the channel, the side being perpendicular to the side through which the first slot is formed.

Each bar has a length and a lengthwise slot at one end of the bar along a portion of the length of the bar. The first pin passes through the slot whereby the bar can pivot about the first pin when one end of the slot is positioned against the pin but the bar cannot pivot about the first pin when the opposite end of the slot is positioned against the pin. Each bar has a length that is longer than the length of the lower, second slot whereby when the bar is positioned within the inner channel a portion of the length of the bar is surrounded by the four side walls of the side rail such that the side walls limit the ability of the bar to pivot about the first pin.

Each bearing or wheel is positioned within the upper, first slot and mounted to a second pin or bolt, the bearing movable along a surface of the inner channel.

The bars are configured to be pivotally mounted to first mounting plates extending through the lower second slots and the second pins are configured to be mounted to second mounting plates such that when the ladder is moved to a vertical, retracted orientation the bearing is movable against an inside surface of the inner channel along the length of the first slot to a position at a first end of the first slot and the bar pivots at one end with respect to the first pins and at a second end with respect to third pins extending from the first mounting plates.

When the ladder is moved to an extended orientation the bearing is movable against the inside surface of the inner channel along the length of the first slot to a position at a second end of the first slot and the bar pivots at one end with respect to the first pins and at a second end with respect to the third pins extending from the first mounting plates.

Embodiments of the ladder may include one or more of the features described above or of the following. For example, the first mounting plates and the second mounting plates may be mounted to a trailer. The side rails may be made of aluminum.

Each of the bars may be received into the second slots in the side rails when the ladder is in a retracted position. The ladder may be part of a trailer or a boat trailer.

The details of various embodiments of the invention are set forth in the accompanying drawings and the description below. Other features and advantages of the invention will be apparent from the description, the drawings, and the claims.

DETAILED DESCRIPTION OF THE INVENTION

Figure 1:
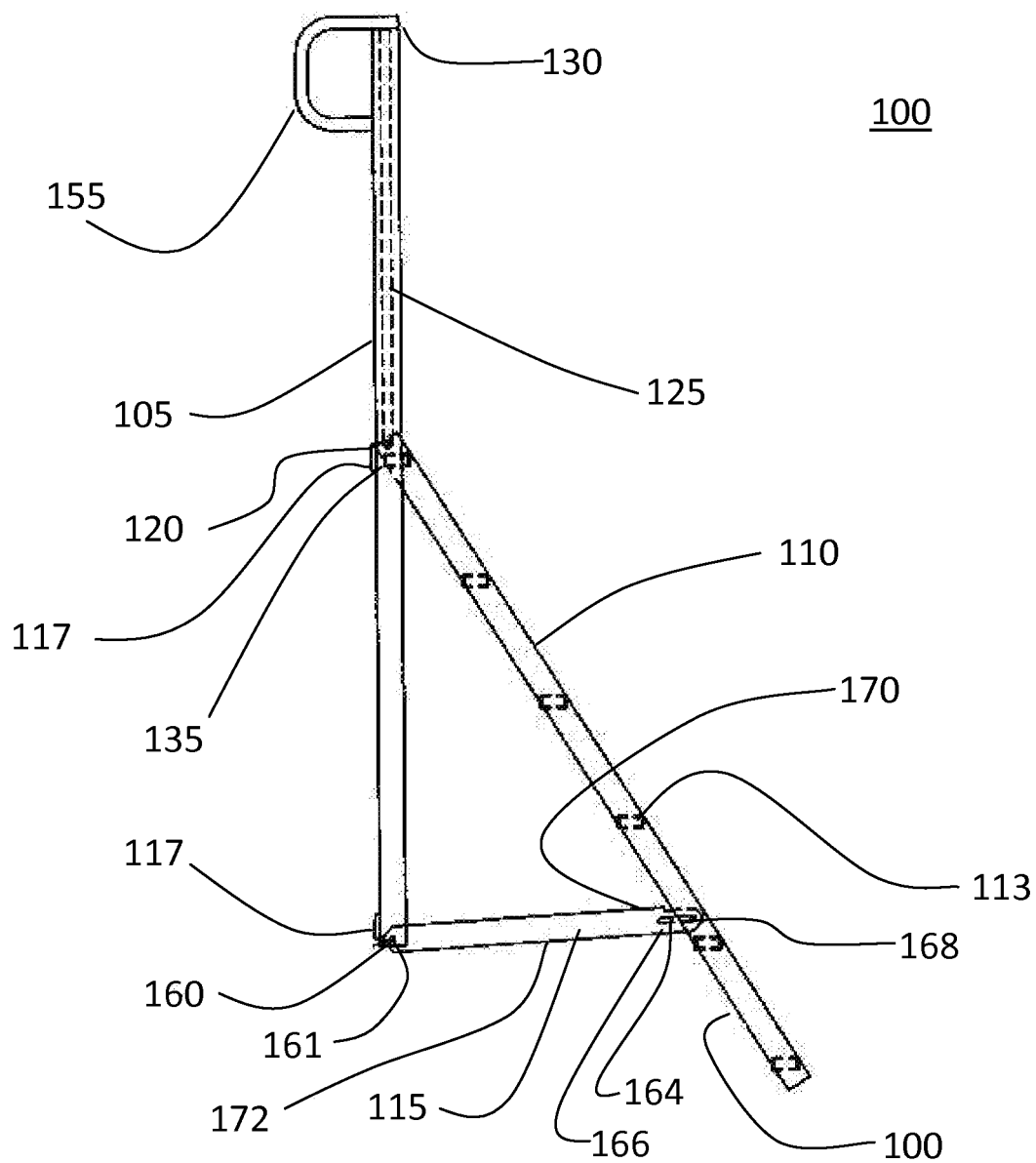
FIG. 1 is a side view of a retractable ladder in an extended position.
Figure 2:
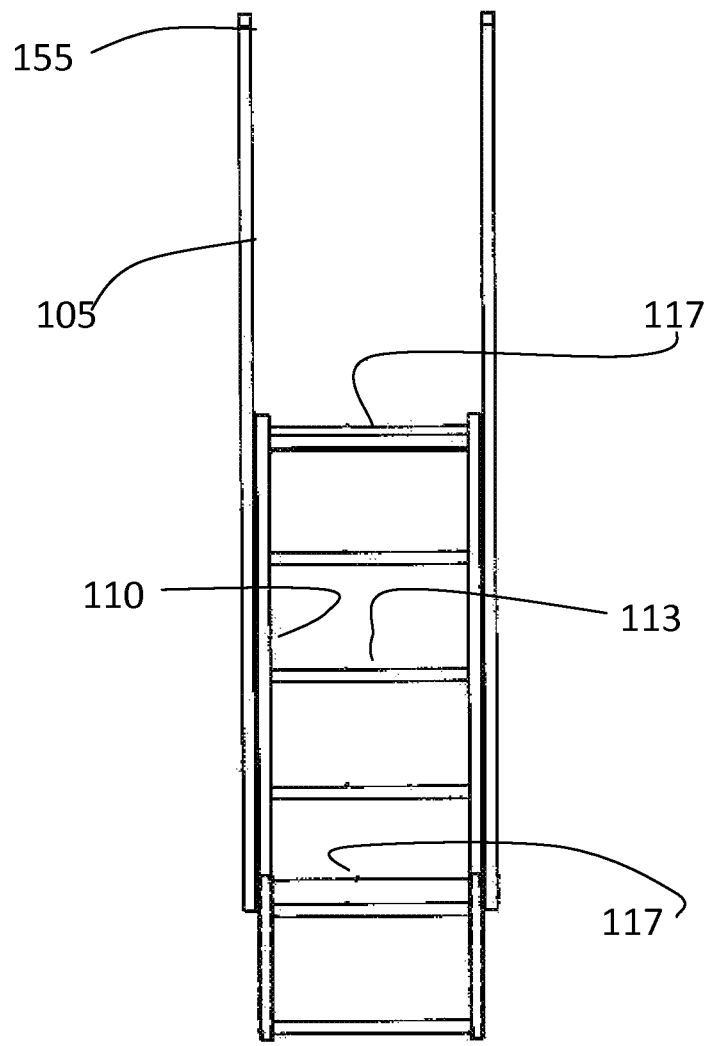
FIG. 2 is a front view of a retractable ladder in an extended position.

Referring to FIGS. 1 and 2, a ladder 100 is shown in an extended position such that a person can climb up or down the ladder. For example, the ladder 100 can be mounted to a boat trailer to allow a person to climb up the ladder onto the bow of the boat. The ladder 100 can be an integral part of the bow stop of the trailer, an integral part of the trailer, or mounted to the bow stop as a component of the bow stop that is mounted to the trailer.

Figure 4:
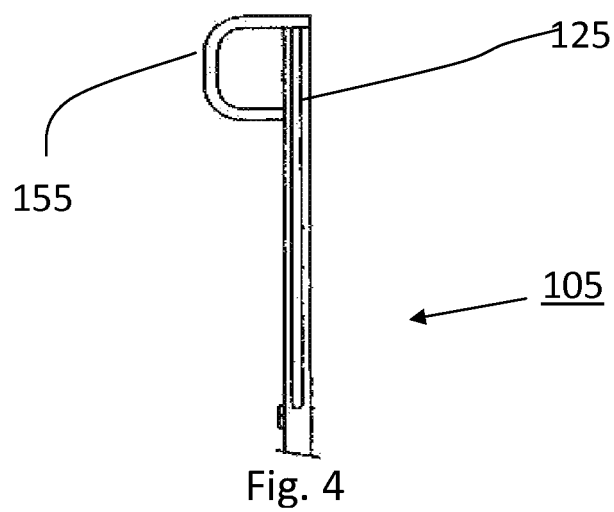
FIG. 4 is a side view showing the inside view of the vertically oriented bar.
Figure 5:
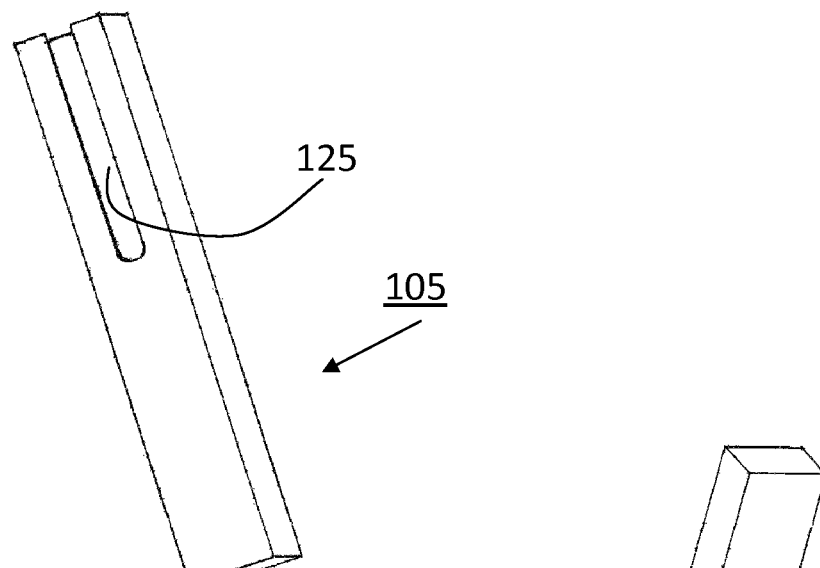
FIG. 5 is a perspective side view of the vertically oriented bar.
Figure 6:
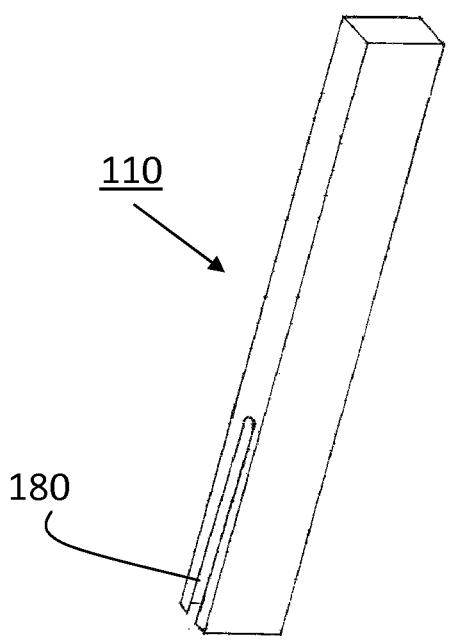
FIG. 6 is a perspective side view of the angled bar.

The ladder includes a first pair of vertically oriented bars 105, a second pair of angled bars 110, and a third pair of horizontally oriented bars 115 that extend between the first pair of bars 105 and the second pair of bars 110. The angled bars 110 are joined by ladder rungs 113 that extend between the bars 110. The vertically oriented bars 105 are joined by a pair of horizontal bars 117 that connect the vertically oriented bars 105. The first pair of bars 105 and second pair of bars 110 are joined at movable connections 120. The first and second bars 105, 110 can be made of rectangular bar, for example aluminum bars. As described in further detail below with respect to FIG. 3, the connection 120 can be in the form of a wheel mounted to a pin in which the wheel rolls within the rectangular bar. FIGS. 1, 4 and 5 illustrate a slot 125 formed within the vertical bar 105. The slot 125 extends along a portion of the length of the bar 105 between an upper opening at one end 130 of the vertical bar 105 and a lower, closed end 135 of the slot in the middle section of the bar.

Figure 3:
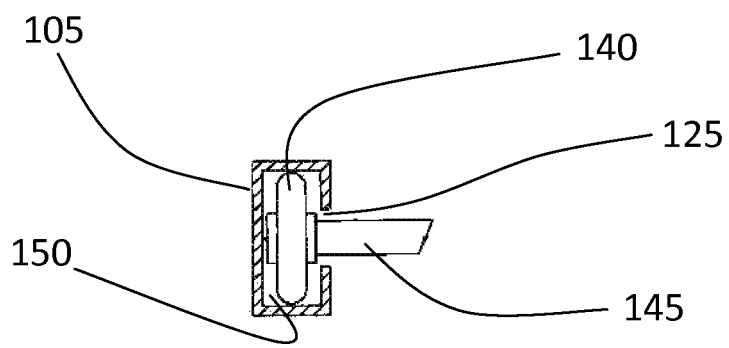
FIG. 3 is a top, cross-sectional view showing a roller within the vertically oriented bar.

As more fully illustrated in FIG. 3, the movable connection 120 includes a wheel 140 mounted on an axle 145 extending from the wheel through the slot 125. The wheel 140 rolls within a cavity 150 of the vertical bar 105. The axle 145 is press fit into one or more openings in the second bar 110. For example, if the axle is made of steel and the second bar is made of aluminum, the axle can be easily press fit into the opening(s). A wheel 140 is positioned in each cavity 150 of the first bars 105 and an axle 145 is press fit into the second bar 110. In one implementation, as illustrated in FIG. 2, the wheels 140 are on the outer edge with the axles pointed inward. In another implementation, the wheels are on the inner edge with the axles pointed outward. In these configurations, the wheels 140 are able to roll within the cavities 150 with the pins passing through the slots 125. The wheels can travel between the upper opening end 130 and the lower end 135. A pair of handles 155 is positioned at the top of the vertical bars 105. The handles 155 function as a handle for someone to grasp when using the ladder as well as a stop to close the open rectangular end of the bar 105 to prevent the wheels from passing out of the bar. As also illustrated in FIG. 2, in one implementation of the ladder the vertical bars 105 are positioned on the outside of the bars 110.

Figure 7:
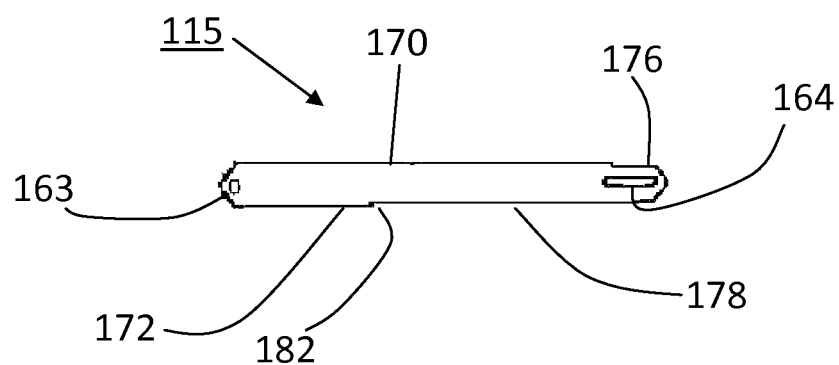
FIG. 7 is a side view of the horizontally oriented bar.

The vertical bars 105 are also connected to the pair of horizontally oriented bars 115 at a connection 160. The connections 160 can be formed using pins or bolts 161 that extend through one or both walls of each vertical bar 105. One of each horizontally oriented bar 115 is positioned on each pin or bolt 161 with the pin passing through an opening at one end of the bar. The horizontally oriented bars 115 are solid or hollow bars, for example, made of aluminum. As illustrated in FIG. 7, each bar 115 includes an opening 162 at one end and an enclosed slot 164 at the other end. The pin that mounts the horizontal bar 115 to the vertical bar 105 passes through the opening 162. The slot 164 is used to mount the horizontal bar to the angled bar 110 at a joint 166. The joint 166 can be formed, for example using a pin 168 press fit through the bar 110 with the pin passing through the slot 164.

The horizontal bar 115 is oriented with respect to the vertical bar 105 and the angled bar 110 such that an upper surface 170 is oriented upwardly and a lower surface 172 is oriented downwardly. As illustrated in FIG. 7, the upper surface 170 includes a short cut out section 176 along a portion of its length. The lower surface 172 includes a long cut out section 178. The cut out sections 176, 178 are sized to permit the bar 115 to fit within the angled bar 110 through a slot 180 in a back surface of the angled bar 110. The short cut out section 176 allows the bar 115 to pivot within and slide into the bar 110. With the slot 164, the bar 115 can slide up into the bar 110 and rest against a shoulder 182. The long cut out section 178 allows the bar 115 to fit completely within the angled bar 110 when the ladder is in the retracted position. For example, if the angled bar 110 has dimensions of 2 inches deep by 1 inches wide and the horizontal bar 115 has a 2 inch depth, the long cut out section 178 is of a depth that is the same as the wall thickness of the angled bar 110. It should be understood that if the horizontal bar 115 of a depth that is less than the depth of the angled bar 110 such that the bar 115 can fit within the angled bar 110, there would be no need for the cut out section 178.

It also should be noted from FIG. 7 that the slotted end is curved. By curving the slotted end, the bar 115 can easily pivot within the bar 110. Upon pivoting the bar horizontal bar 115 within the angled bar 110 and sliding it up into the angled bar 110, the ladder is transitioned from the extended position to the retracted position. In the retracted position, a length of the bar 115 is inserted into the bar 110 beyond the slot 180 such that the bar 115 cannot pivot with respect to the bar 110. The bar 115 may rest against the pin 168 at one end of the slot in the retracted position. To allow the bar 115 to pivot with respect to the bar 110, the bar 110 must be pulled up so that the pin 168 is at the opposite end of the slot 164. The joint formed between the bars 110, 115 then can be pushed or pulled outward from the vertical bars 105 and transitioned into the extended position.

Figure 8:
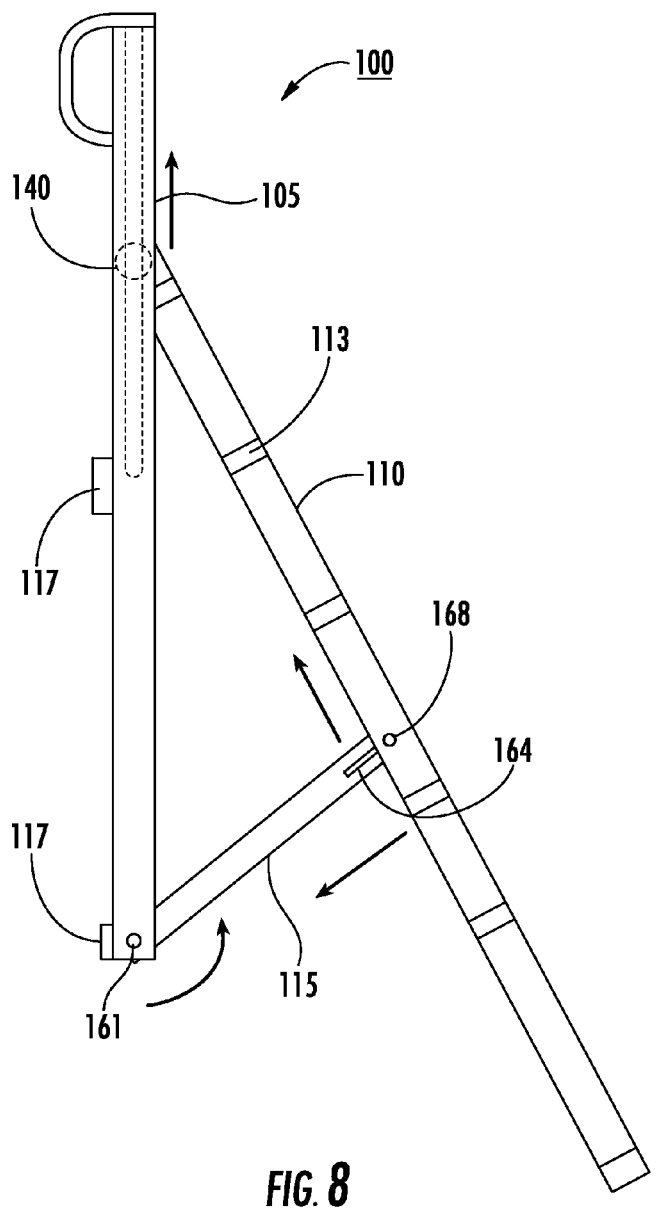
FIG. 8 is a side view of the retractable ladder of FIG. 1 in a partially retracted position.
Figure 9:
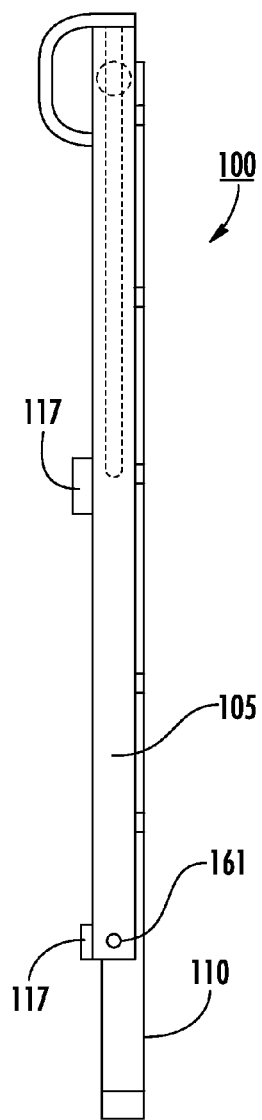
FIG. 9 is a side view of the retractable ladder of FIG. 1 in a fully retracted position.

FIGS. 8 and 9, in combination with FIG. 1, illustrate moving the ladder from a fully extended position (FIG. 1), to a partially extended/retracted position (FIG. 8), to a fully retracted position (FIG. 9). In FIG. 8, the horizontal bar 115 is pivoting counterclockwise with respect to the pins 161 and 168 while the wheel 140 is rolling upward from a central portion of the vertical bar 105 to an upper portion of the bar 105. In pivoting the horizontal bar 115, the bar is moved in a direction to become coplanar with the vertical bar 105. Simultaneously, the angled bar 110 is moved in a direction to become coplanar with both the vertical bar 105 and the bar 115. The fully retracted position illustrated in FIG. 9 shows the bars 105, 110, 115 in a plane. In this position, the bar 115 is completely enclosed within the bar 110.

Figure 10:
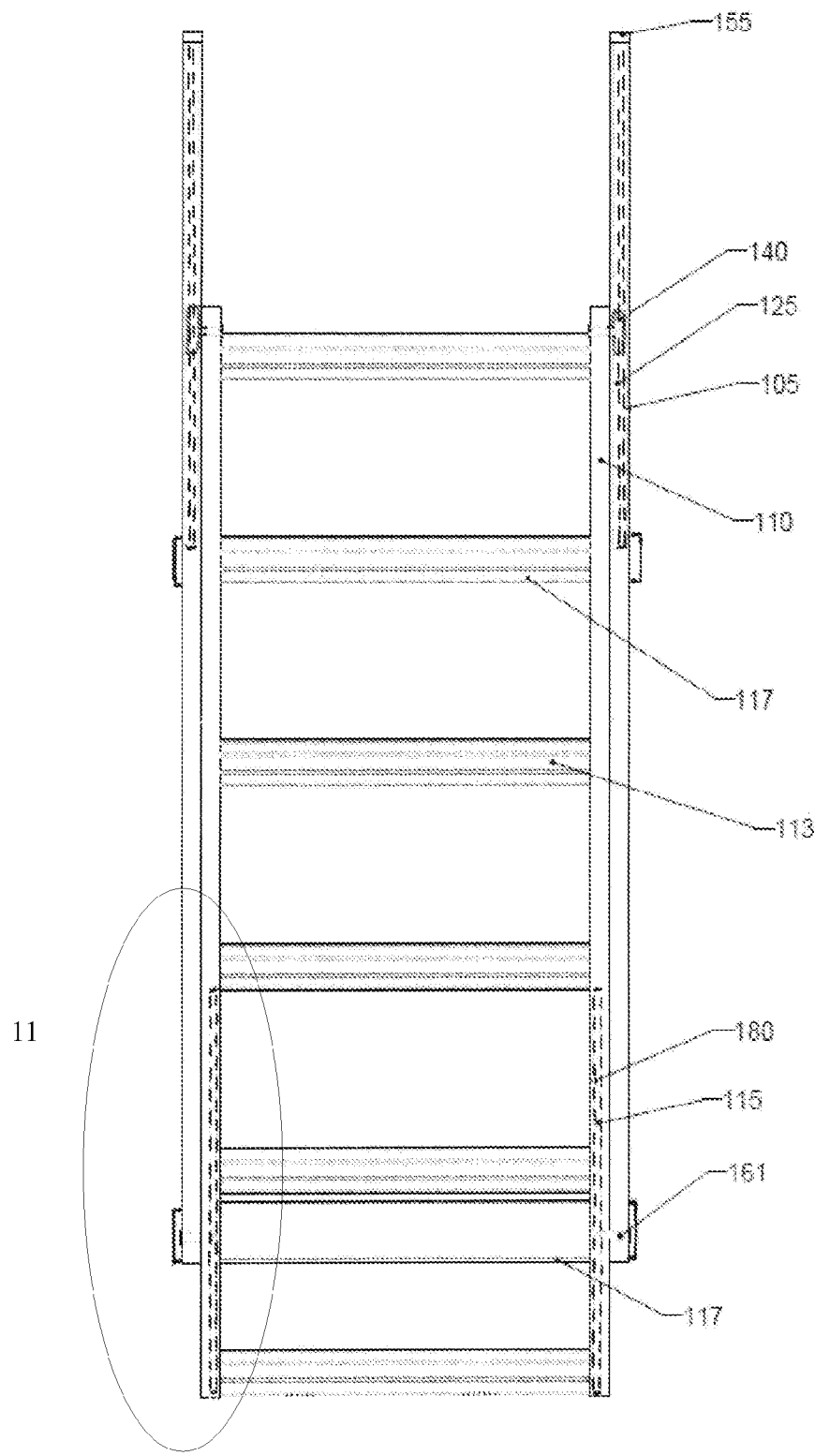
FIG. 10 is a front view of the retractable ladder of FIG. 9 in a fully retracted position.
Figure 11:
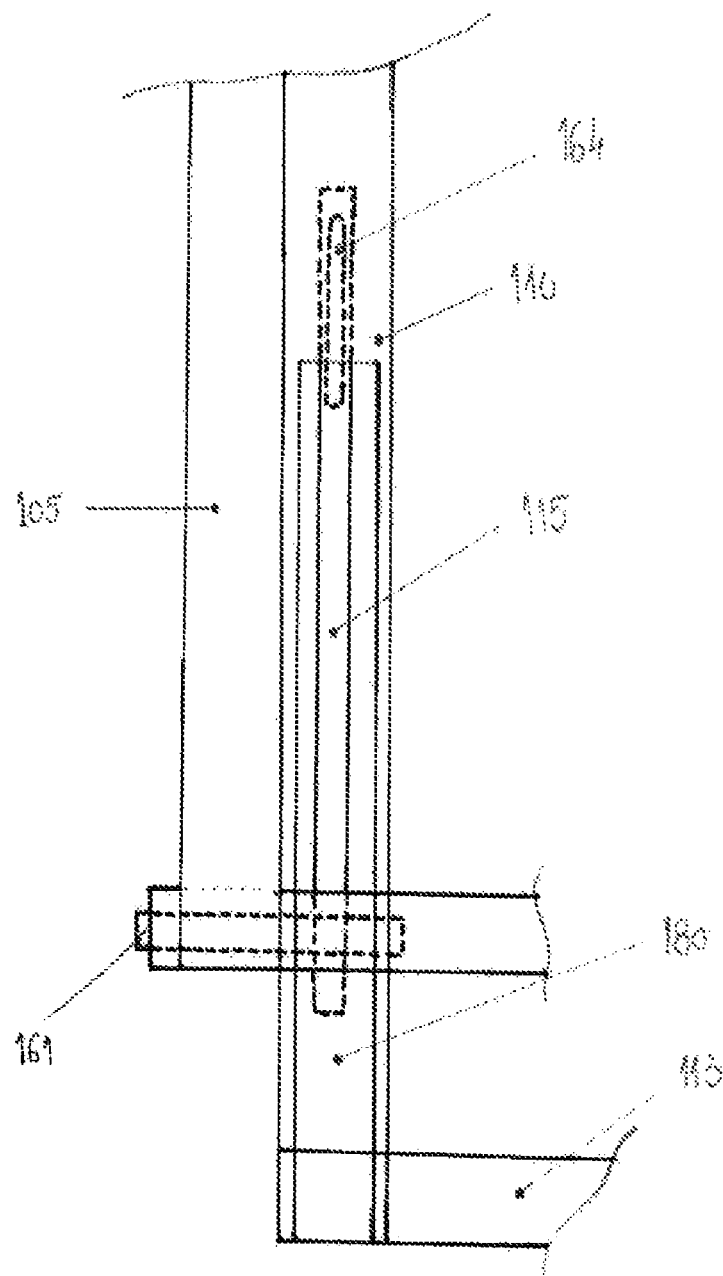
FIG. 11 is a rear view of the retractable ladder of FIG. 10 taken along section line 11 of FIG. 10.

The fully retracted position is more completely illustrated in FIGS. 10 and 11. FIG. 10 shows the bars 110 and rungs 113 extending between being positioned between the vertical bars 105. The bars 115 are positioned within the bars 110 by passing through the slots 180 machined into the back surface of the bars 110. As illustrated in FIG. 11, because of the slot 164 in the bar 115, the bar 115 can slide up into the bar 110 such that an end of the bar 115 extends beyond the slot 180. In this manner, unless the bars 110 are pulled upward, the ladder 100 will be kept fixed in a retracted position.

Figure 12:
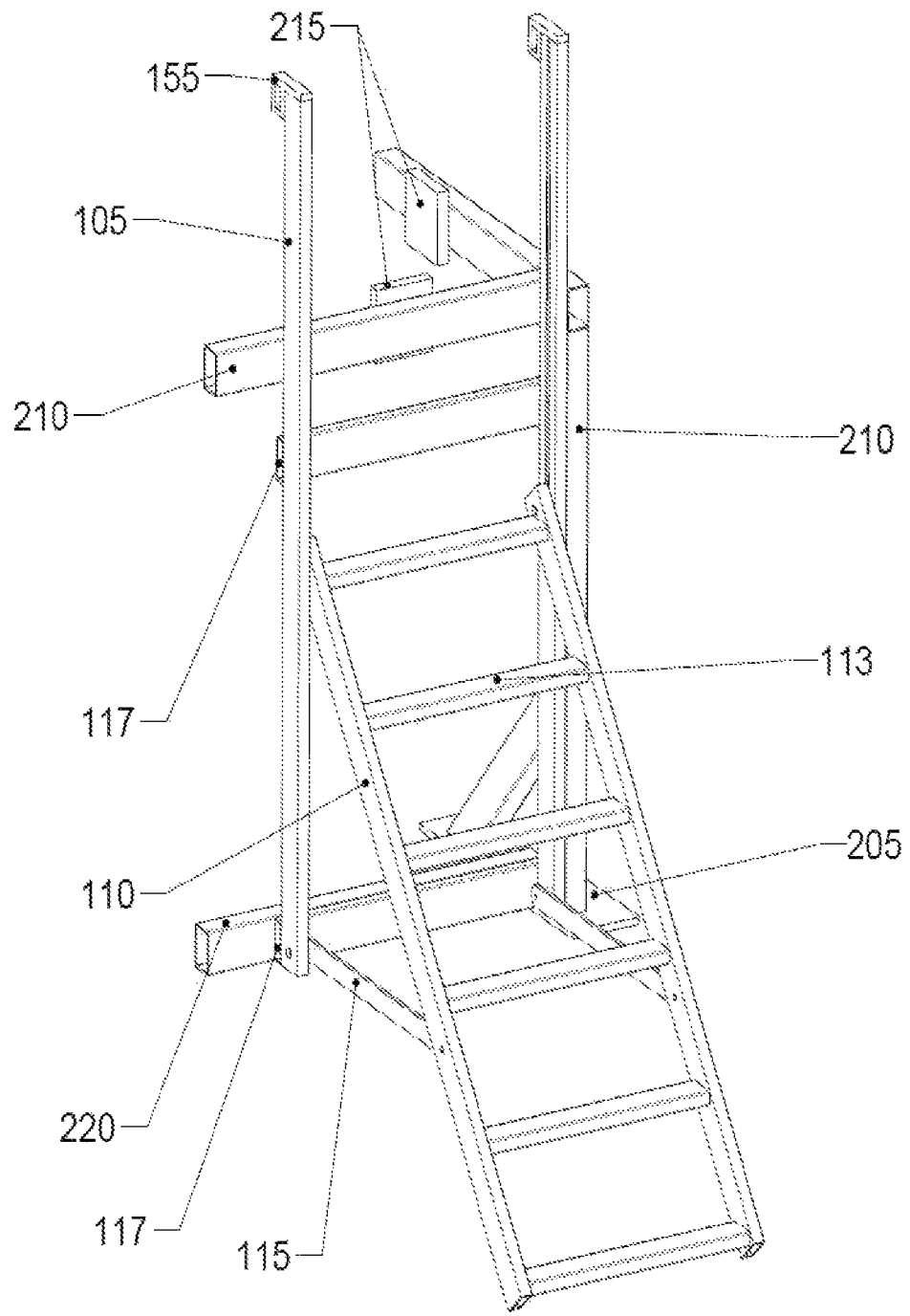
FIG. 12 is a perspective view of the ladder of FIG. 1 mounted to a bow stop for a boat trailer.

Referring also to FIG. 12, the ladder 100 may be part of a bow stop 200 that is part of a boat trailer or mounted to a boat trailer. The bow stop 200 includes a bottom plate 205, a vertical post 210 extending up from the plate 205, a pair of bow stop arms 210, and a bow stop pad 215 on each arm 210. Although many different variations are expected to work for mounting the ladder 100 to the bow stop 200, in one implementation the bow stop includes a mounting arm 220 to which the lower arm 117 or vertical bars 105 are mounted. The vertical bars 105 also may be mounted to one of the bow stop arms 210. The mounting arm 220 is coplanar with one of the bow stop arms 210 such that the ladder 100 can be easily mounted to the bow stop 200. Although not shown, the bow stop 200 may include a winch mounted to the post 210 such that the winch can be used to pull the boat up on the trailer As is known in the art, if the bow stop 200 is a separately manufactured part, the bow stop may be mounted to a boat trailer. To mount the bow stop to the trailer, the plate 205 is placed on the tongue of the trailer and then held in place, for example by bolts. One conventional means of mounting the plate to the tongue of the trailer is through the use of U- or C-bolts that pass over the plates and around the trailer tongue.

Figure 13:
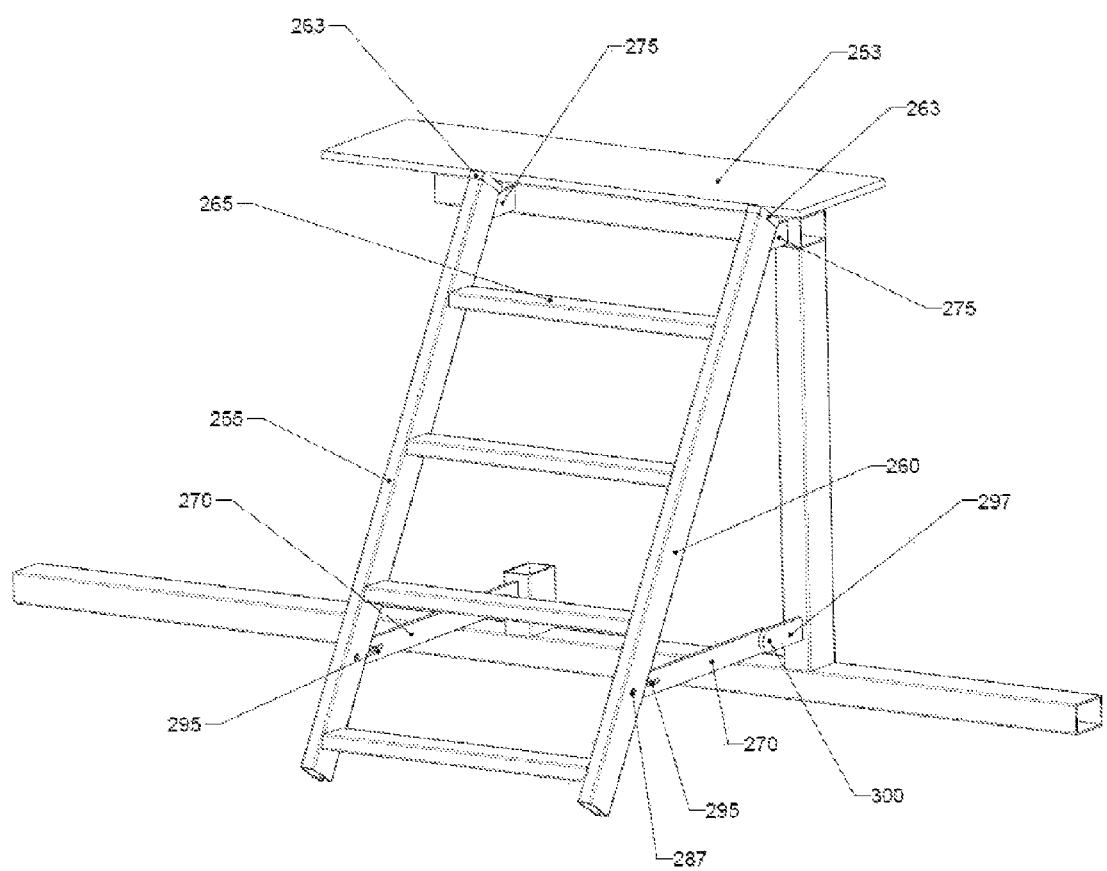
FIG. 13 is a perspective view of a second implementation of an extendable ladder mounted to a trailer with the ladder being in an extended position.

Referring to FIGS. 13-22, in a second implementation, the extendable ladder is mounted to existing mounts on a boat trailer or other trailer. The trailer may have plates for mounting a fixed ladder to the trailer and these plates will be used to mount the extendable ladder to the trailer by either removing the fixed ladder or mounting to the trailer prior to mounting of the fixed ladder. FIG. 13 shows the extendable ladder 250 having side rails 255, 260, one or more rungs 265, and bars 270. The bars 270 are very similar or to may be the same as the bars 115 described above. The side rails may be made of rectangular or square bar, such as aluminum bar or another metal material. Other durable and strong materials may be used instead for the side rails. The ladder permits climbing to a platform 253 on the trailer.

Figure 14:
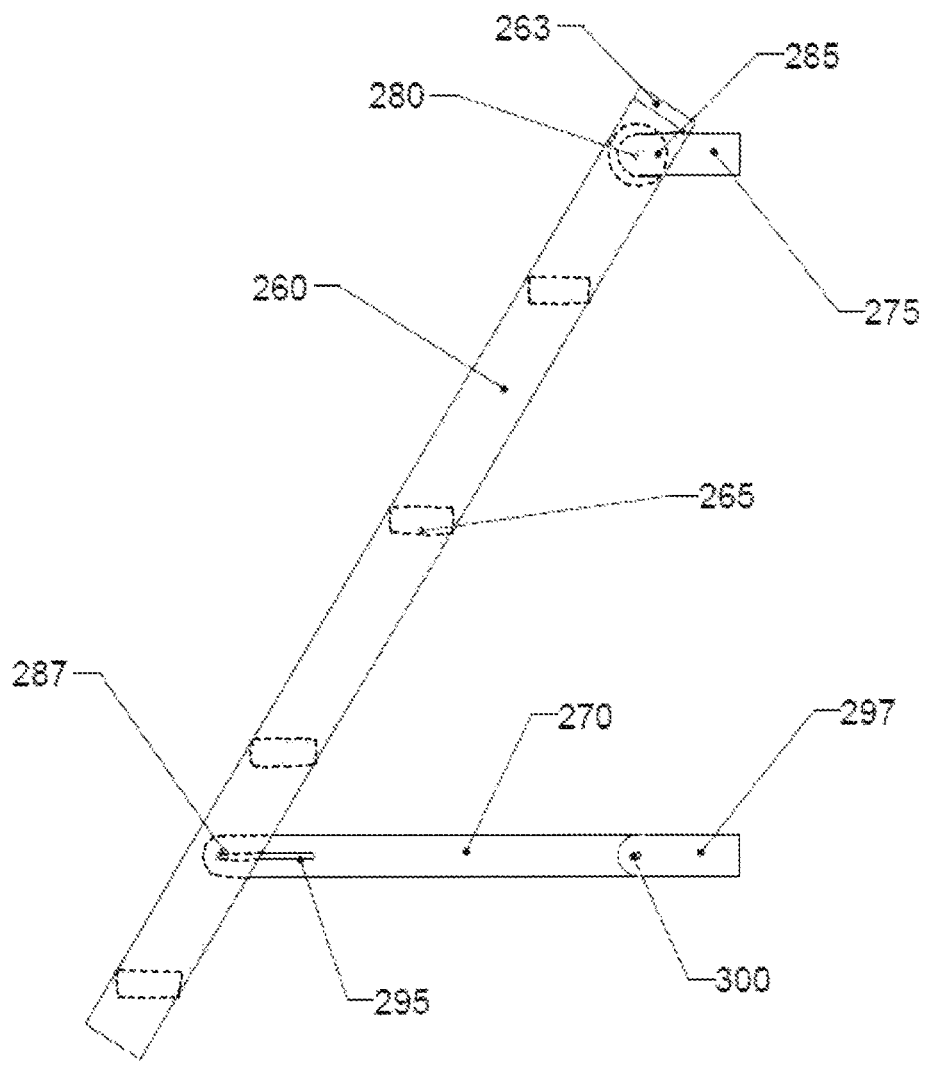
FIG. 14 is a side view of the extendable ladder of FIG. 13 showing the ladder in the extended position.

A hand rail, not shown, may be mounted to the platform, adjacent to the platform or otherwise on the trailer such that an individual may climb the extended ladder 250 to the platform while using the hand rail for assistance. The side rails 255, 260 are mounted to plates 275 that extend from a trailer frame. Referring also to FIG. 14, the side rails are mounted to the plates by a bearing 280 or wheel that slides within the side rails. Each bearing 280 is mounted to the plate 275 by means of a pin 285 or bolt that extends from the plate and passes through the bearing, allowing the bearing to rotate around the pin or bolt. Caps 263 positioned at the end of the side rails prevent the bearing from passing out of the side rails when the ladder is being extended, as described in more detail below.

The bars 270 are attached to individual side rails 255, 260 by a pin 287 that extends through a channel 290 within each side rail from one inside surface of the side rail to the opposite inside surface of the side rail. The pin 287 passes through a slot 295 in the bar 270 that extends lengthwise along a portion of the length of the bar 270. The opposite end of the bar is mounted to a plate 297 by a pin 300 or bolt that extends from the plate and passes through the bar. The bar can thereby pivot with respect to the plate around the longitudinal axis of the pin. Similarly, the bar can pivot with respect to the pin 287 passing through the slot 295 at the other end of the bar. The bar also can slide over the pin 287 along the slot 295 between the two ends of the slot.

Figure 15:
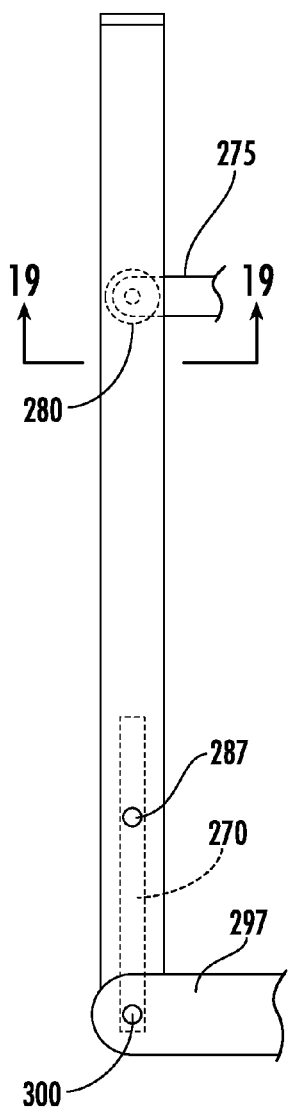
FIG. 15 is a side view of the extendable ladder of FIG. 13 showing the ladder in the retracted position with hidden line depictions of components of the ladder within side rails of the ladder.

FIG. 15 is a side view of the left side rail 255 using hidden lines to show the bar 270 positioned within the channel 290 at one end of the side rail and using hidden lines to show the bearing 280 positioned within the channel 290. FIG. 15 differs from FIG. 14 based on the position of the ladder. FIG. 15 illustrates the ladder 250 in an extended position, which is evident by the bearing 280 being positioned at one end of the side rail and the bar 270 extending from the side rail in a manner showing the bar 270 to be being generally perpendicular to the side rail 260. In contrast, FIG. 15 shows the ladder 250 in a retracted position, which is evident based on the bearing 280 being positioned a distance away from the end of the side rail. This positioning indicates that the side rail has been pushed up vertically such that one end of the side rail is vertically positioned above the bearing. Further, in the retracted position the entirety of the bar 270 is positioned within the channel 290.

Figure 16:
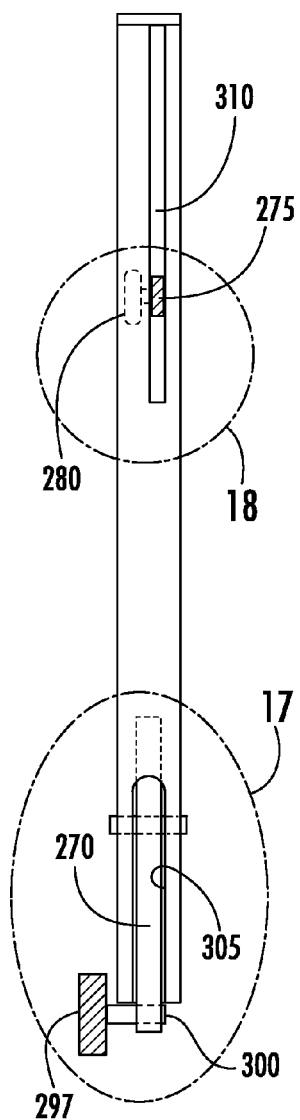
FIG. 16 is rear view of the extendable ladder of FIG. 15 showing the ladder in the retracted position with hidden line depictions of components of the ladder within the side rails of the ladder.
Figure 17:
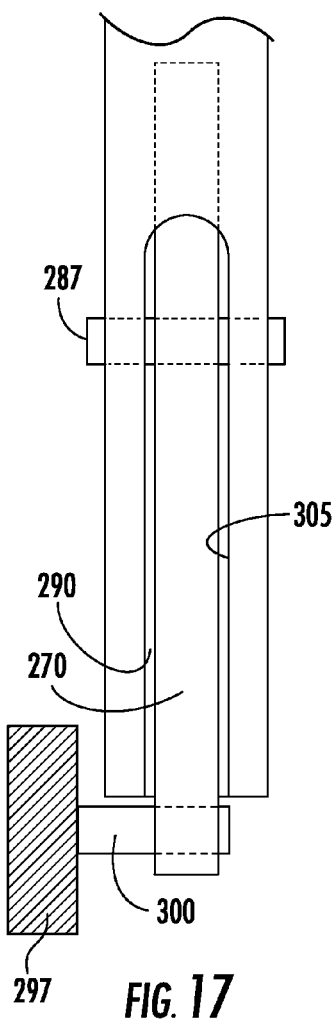
FIG. 17 is an enlarged view taken at section line 17 of FIG. 16 showing the interaction of the bar, mounting plate and pin within the channel at the bottom of the side rail.
Figure 18:
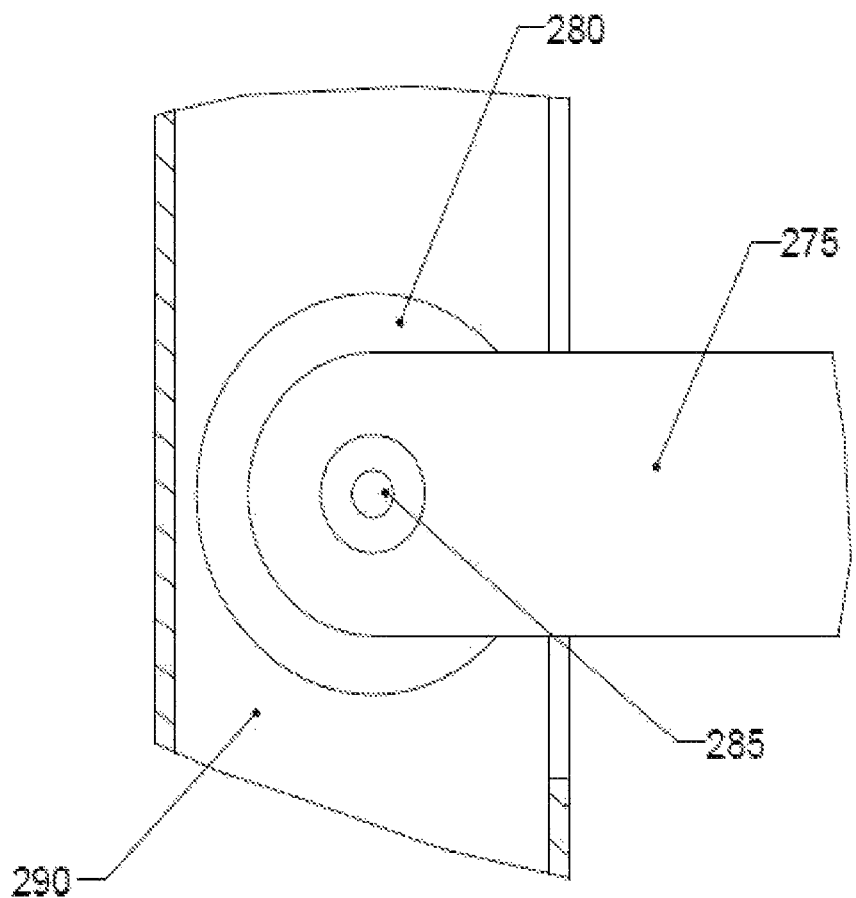
FIG. 18 is an enlarged view taken at section line 18 of FIG. 16 showing the interaction of the bearing, mounting plate and pin within the channel at the top of the side rail.
Figure 19:
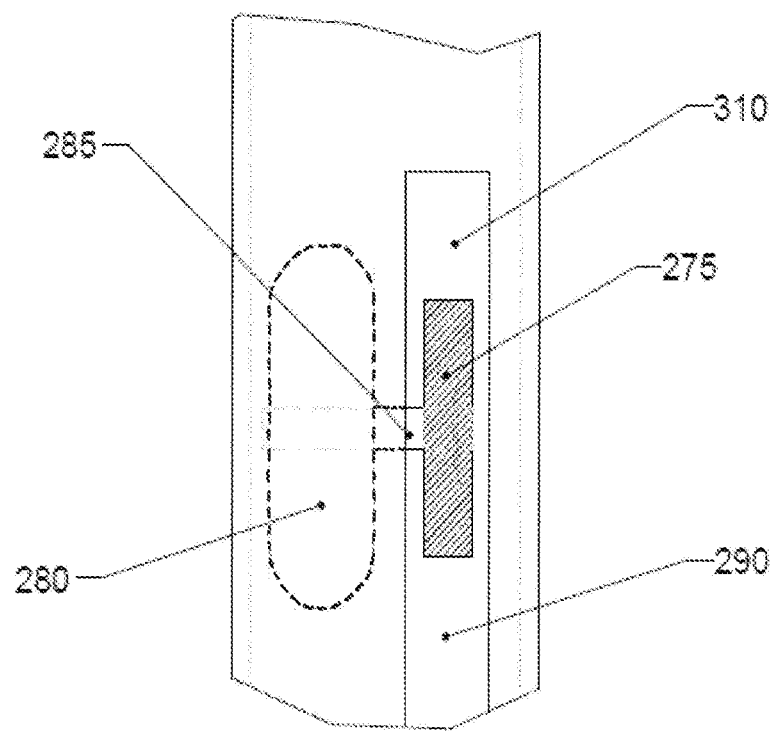
FIG. 19 is an enlarged view showing the positioning of the bearing, pin and mounting plate within the channel of the side rail.
Figure 20:
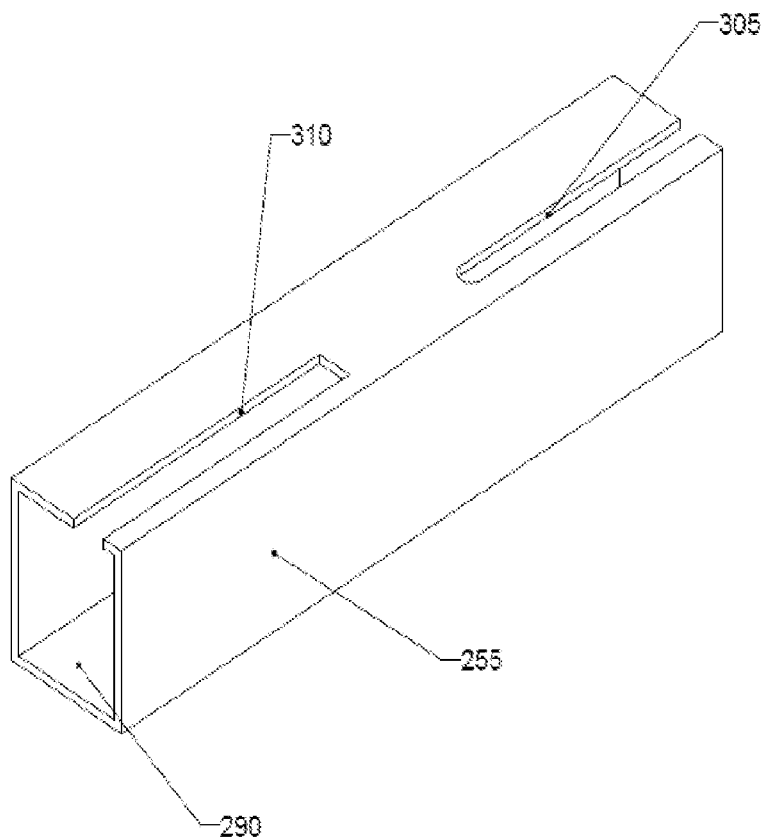
FIG. 20 is a perspective view of a side rail of the ladder of FIG. 13 showing the slots for the bar at one end and the bearing at the other end.
Figure 21:
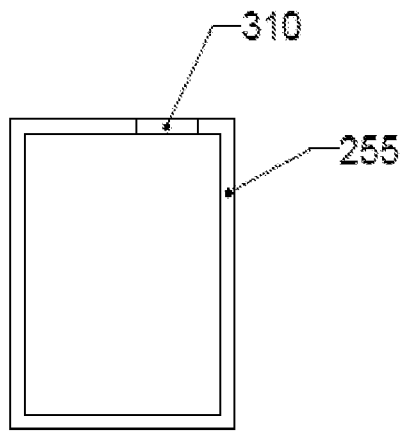
FIG. 21 is an end view of the side rail of FIG. 20.
Figure 22:
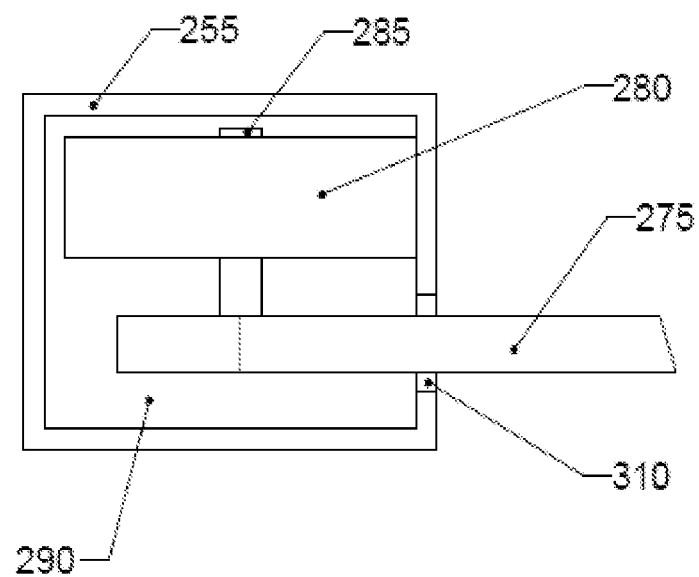
FIG. 22 is an end view of the side rail of FIG. 20 illustrating the position of the bearing and pin within the channel and the passage of the mounting plate through the slot in the side rail.

As illustrated in FIGS. 16 and 17, the bar 270 is of a length that is longer than the length of a slot 305 at one end of the side rail. The pin 287 is positioned in the channel 290 within the opening formed by the slot 305 such that the bar can pivot around the pin. However, because the bar has a lengthwise slot 295, the bar must be pulled vertically down such that the pin 287 is positioned at the end of the slot to permit the bar to pivot about the pin. If the bar is only pulled down partially, the length of the bar on the upper side of pin will interact with one side of the inside wall of the side rail channel and the length of the bar below the pin will interact with the opposite side of the inside wall and prevent a pivoting motion of the bar relative to the pin. It is this interaction with the inside wall of the side rail channel that prevents unintentional extension of the ladder, e.g., when the trailer is being used to transport a boat on a road. To extend the ladder, the user must intentionally raise the ladder up such that the end of the slot 295 is adjacent to the pin 287. The bar then can pivot about the pin because there is no inside wall section of the side rail to prevent the movement of the bar relative to the pin.

FIGS. 15 and 16 also illustrate the position of the bearing 280 within the channel 290 at the top end of the ladder. FIGS. 18-22 provide various views that show the cross section of the side rails to include an offset slot 310 in which the plate 275 passes and the pin 285 connects to the wheel or bearing 280. Because the slot 310 is offset from the center of the side rail, the side wall through which the slot is formed has sufficient land to permit the bearing to roll within the channel.

To use the extendable ladder 250 from a retracted position, the individual grasps the side rails 255, 260 and lifts the ladder up in a vertical direction until the individual feels the pin 287 reach the end of the slot 295 in the bar 270. This will be evident because the ladder cannot be lifted vertically beyond this point. While continuing to grasp the side rails, the individual then pulls the ladder away from the mounting plates 275, 297 on the trailer. Because the end of the slot 295 of the bar 270 is positioned at the pin 287, the side rails 255, 260 will pivot around the pin 287 with respect to the bars 270. Simultaneously, the interaction between the bearing 280, mounting plate 275 and the channel 290, the top of the ladder will be pulled down while the bottom of the ladder is pulled away from the trailer. This movement will result in the bottom of the ladder moving down to the ground while the top of the ladder moves down but remains approximately even with the plates 275. The caps 263 at the top of the side rails will prevent the bearing from sliding out of the channel and also terminate downward movement of the ladder. Further, the pin 285 will permit the side rails to pivot with respect to the mounting plates 275 such that the bottom of the ladder is extended away from the trailer while the top of the ladder remains adjacent to the trailer. The individual then can climb the rungs 265 to reach the platform 253 and walk safely to a boat held on the trailer. While climbing the ladder, the individual can use a handle for assistance in climbing the ladder. Such handles may be mounted to the trailer, e.g., to the platform 253 or elsewhere on the trailer, and are known in the art.

To retract the ladder, the individual grasps the side rails 255, 260 and lifts the ladder vertically while pushing the ladder in the direction of the boat trailer. Because the ladder will pivot at the top because of the interaction of the bearing 280, pin 285 and plate 275, the ladder can transition to a vertical orientation. In transitioning to the vertical orientation, the bar 270 will pivot at one end about the pin 300 to permit the bar to attain a vertical orientation. At the other end of the bar 270, the slot 295 will slide over the pin 287 and that end of the bar will be encompassed within the cavity 290 with the end of the bar 270 extending up into the side rail beyond the slot 305 such that at least a portion of the bar is surrounded by all four walls of the side rail. Upon releasing the ladder once it is in a vertical orientation, the side rails will rest against the bars 270 and mounting plate 297. The positioning of the top portion of the bars 270 within the channel will prevent outward movement of the side rails and the positioning of the side rails against the mounting plate 297 will prevent downward movement of the side rails. In combination, these two interactions will ensure that the ladder stays in a secure position while transporting the trailer.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A ladder for mounting to a trailer to allow access to the trailer, the ladder comprising:
    a pair of side rails, the side rails having a length defined between an upper, first end and a lower, second end, an inner channel passing between the first end and the second end and defined by at least four sides having inner and outer surfaces, and an upper, first slot in one of the sides passing from the inner surface to the outer surface and extending from the first end to a middle portion of the side and a lower, second slot in one of the side passing from the inner surface to the outer surface and extending from the second end to the middle portion of the side, wherein the upper, first slot does not extend to the lower, second slot;
    one or more ladder rungs extending between the side rails;
    each side rail further including a respective first pin or bolt extending from at least one side of the channel, the side being perpendicular to the side through which the first, upper slot is formed;
    a pair of bars, each bar having a length and a lengthwise slot at one end of the bar along a portion of the length of the bar, each respective first pin passing through the lengthwise slot in the respective bar whereby the respective bar can pivot about the respective first pin when one end of the lengthwise slot is positioned against the pin but the bar cannot pivot about the respective first pin when the opposite end of the lengthwise slot is positioned against the pin, and each respective bar has a length that is longer than the length of the lower, second slot whereby when the bar is positioned within the inner channel a portion of the length of the bar is surrounded by the four side walls of the side rail such that the side walls limit the ability of the bar to pivot about the first pin; and
    a bearing or wheel positioned within the upper, first slot and mounted to a second pin or bolt, the bearing movable along a surface of the inner channel,
    whereby the bars are configured to be pivotally mounted to first mounting plates and extend through the lower, second slots and the second pins are configured to be mounted to second mounting plates such that when the ladder is moved to a vertical, retracted orientation the bearing is movable against an inside surface of the inner channel along the length of the upper, first slot to a position at a first end of the upper, first slot and the bar pivots at one end with respect to the first pins and at a second end with respect to third pins extending from the first mounting plates, and
    when the ladder is moved to an extended orientation the bearing is movable against the inside surface of the inner channel along the length of the upper, first slot to a position at a second end of the upper, first slot and the bar pivots at one end with respect to the first pins and at a second end with respect to the third pins extending from the first mounting plates.

2. The ladder of claim 1, wherein the first mounting plates and the second mounting plates are mounted to a trailer.

3. The ladder of claim 1, wherein the side rails are made of aluminum.

4. The ladder of claim 1, wherein each of the bars is received into the second slots in the side rails when the ladder is in a retracted position.

5. A boat trailer having the ladder of claim 1.

6. A trailer having the ladder of claim 1.

* * * * *